United States Patent [19]

Saito

[11] 4,251,838
[45] Feb. 17, 1981

[54] AUTO-TRACKING CONTROL SYSTEM FOR USE IN APPARATUS FOR REPRODUCING A VIDEO SIGNAL RECORDED IN SUCCESSIVE PARALLEL TRACKS ON A RECORDING MEDIUM

[75] Inventor: Etsuro Saito, Kanagawa, Japan

[73] Assignee: Sony Corporation, Tokyo, Japan

[21] Appl. No.: 16,923

[22] Filed: Mar. 2, 1979

[30] Foreign Application Priority Data

Mar. 3, 1978 [JP] Japan ............................. 53-26378[U]

[51] Int. Cl.³ ..................... G11B 5/52; G11B 21/10; G11B 21/18
[52] U.S. Cl. ..................................... 360/77; 360/70; 360/107; 360/109
[58] Field of Search ....................... 360/77, 70, 75, 76, 360/78, 105, 107, 109; 310/330–332, 316, 317

[56] References Cited

U.S. PATENT DOCUMENTS

| | | | |
|---|---|---|---|
| 3,126,535 | 3/1964 | Streeter | 360/77 |
| 3,663,763 | 5/1972 | Trost | 360/70 |
| 4,099,211 | 7/1978 | Hathaway | 360/107 |
| 4,151,570 | 4/1979 | Ravizza | 360/109 |

Primary Examiner—Alfred H. Eddleman
Attorney, Agent, or Firm—Lewis H. Eslinger; Alvin Sinderbrand

[57] ABSTRACT

An auto-tracking control system for use in a helical scan video tape apparatus for reproducing video signals recorded in skewed parallel tracks on a video tape includes a magnetic reproducing head mounted on an electro-mechanically deflectable head support. The head support has a first portion responsive to high frequency dithering or wobbling control signals and a second portion responsive to low frequency skew or mistracking control signals.

28 Claims, 12 Drawing Figures

AUTO-TRACKING CONTROL SYSTEM FOR USE IN APPARATUS FOR REPRODUCING A VIDEO SIGNAL RECORDED IN SUCCESSIVE PARALLEL TRACKS ON A RECORDING MEDIUM

BACKGROUND OF THE INVENTION

1. Field of the Invention

This invention relates to an auto-tracking control system suitable for use with a video tape recorder having a rotary head drum assembly, and more particularly to an auto-tracking control system in which a magnetic head is mechanically vibrated transverse to its scanning path at a relatively low frequency to correct tracking error and is dithered at a high frequency across its scanning path to generate a tracking control signal.

2. Description of the Prior Art

The prior art contains examples of systems in which a reproducing magnetic head in a helical scan video tape recorder for reproducing video signals recorded on a magnetic tape is mounted on a piezo-electric element which is deflected in the width direction of a recorded track by a control signal to control the scanning path of the reproducing magnetic head with respect to the recorded track. Such piezo-electric elements conventionally include bi-morph leaves of piezo-ceramic material which respond to control voltages applied thereto.

A bi-morph leaf includes two plates of piezo-ceramic material longitudinally aligned with each other and bonded together at their abutting faces. Electrodes deposited on both surfaces of each plate permit the application thereto of control signals. In response to control signals the plates deflect together with an amplitude and direction normal to their abutting faces which is determined by the magnitude and polarity of the control signals applied thereto.

One type of control signal applied to bi-morph leaves of the prior art is a relatively high frequency "dithering" or "wobbling" signal which rapidly deflects the reproducing magnetic head in small-amplitude sine-wave excursions in the width direction about a mean scanning path. The reproduced signal from the reproducing magnetic head contains amplitude variations as the reproducing magnetic head is dithered across the recorded track successively into and out of coincidence therewith. The phase of the amplitude variations is compared with the phase of the dithering or wobbling control signal to derive from the comparison a tracking control signal which is then used to align the mean scanning path of the reproducing magnetic head with the recorded track.

Bi-morph leaves can be made with a resonant frequency of as high as about 900 Hz. The dithering or wobbling frequency is desirably high but is limited to a value below this frequency. A frequency of about 720 Hz has been conveniently employed in auto-tracking control systems of the prior art.

A second type of control signal is required especially when a tape transport speed is used during reproduction which is different from the tape transport speed used during recording. Skewed parallel recorded tracks in a helical scan system have a skew angle which is partly established by the tape transport speed employed during recording. When reproduction is performed at still, slow or fast tape transport speeds, the head scanning path is skewed with respect to the recorded track. Conventionally, each recorded track contains video information for all of the television lines in a field or a frame, depending on the system. One recorded track is scanned in 1/60 second (one field per track) or 1/30 second (one frame per track). To correct for skew of a recorded track with respect to a scanning path, a saw wave control signal applied to a bi-morph leaf is smoothly varied during the time the reproducing magnetic head travels from one end of a recorded track to the other. Thus, the saw wave control signal has a repetition frequency of from about 30 to about 60 Hz. Besides being of lower frequency than the dithering displacement, the amplitude of the low-frequency deflection of the reproducing magnetic head required to compensate for track skew is much larger. A bi-morph leaf for low frequency, large amplitude response is designed with some combination of material, shape, greater mass, width, length and thickness to accomplish this response. A bi-morph leaf for high frequency, small amplitude response is designed with some combination of material, shape, smaller mass, width, length and thickness. Thus the parameters required to accomplish high and low frequency response are mutually exclusive. An attempt to provide a single compromise bi-morph leaf capable of responding to both high and low frequency control signals results in a device having inferior response to both.

In U.S. Pat. No. 4,099,211 issued July 4, 1978, a single composite control signal containing the above-described high and low frequencies is supplied to a bi-morph leaf assembly which includes first and second bi-morph leaf elements connected to each other in longitudinal alignment and having similar frequency characteristics. Direct and inverted phases of the composite control signal are applied to electrodes of the first and second leaf element, respectively, to deflect the bi-morph leaf element in opposite directions. Therefore, the gap of a reproducing magnetic head mounted on one of the leaf elements is deflected to dither as previously described and to maintain the scanning path traced by the gap of the reproducing magnetic head appropriately aligned with the recorded track on the tape surface during auto-tracking. Moreover, due to the opposite deflections of the first and second leaf elements, the contact surface of the reproducing head is not angled relative to the tape surface as a consequence of the deflections of the head.

As described above, the high and low frequencies required for dithering and for correction of track skew are related by frequency ratios of 12 or 24. This wide frequency difference makes it difficult or impossible to equally accommodate both signals with a single bi-morph leaf. In addition, the displacement required of the magnetic head in response to the low frequency component of the control signal is much greater than the displacement required in response to the high frequency component. The differing amplitude requirements make it even more difficult to produce a single bi-morph leaf capable of satisfying the conflicting requirements. Consequently, satisfactory auto-tracking control operation is not obtainable with an electro-mechanical transducing element or elements designed for either high frequency-low amplitude operation or low frequency-high amplitude operation, or for a compromise therebetween.

OBJECTS AND SUMMARY OF THE INVENTION

An object of this invention is to provide an auto-tracking control system which avoids the disadvantages of the prior art.

Another object of this invention is to provide an auto-tracking control system in which a head support member comprising an electro-mechanical transducing element for supporting and deflecting a reproducing head is capable of response to control signals having a wide frequency range.

Another object of this invention is to provide an electro-mechanical transducing element responsive over a wide frequency range which is simple in construction and which overcomes the defects of conventional auto-tracking control systems.

Another object of this invention is to provide an auto-tracking control system in which a control signal of relatively high frequency is supplied to the head support member for effecting a "wobbling control" or "dithering control" of the reproducing magnetic head.

A further object of this invention is to provide an auto-tracking control system which is responsive to a control signal of relatively low frequency supplied to the head support member for effecting a "skew control" of the reproducing magnetic head.

A still further object of this invention is to provide an auto-tracking control system in which the head support member includes a plurality of deflectable portions having substantially different frequency response characteristics which respond to substantially different frequency components of a control signal supplied to the plurality of deflectable elements to control the position of the reproducing magnetic head.

A still further object of this invention is to provide an auto-tracking control system in which the head support member includes two deflectable portions having different masses and a control signal of relatively high frequency is supplied the deflectable portion having the smaller mass and a second control signal of relatively low frequency is supplied to the deflectable portion having a larger mass to control the position of the reproducing magnetic head.

A still further object of this invention is to provide an auto-tracking control system in which the head support member includes two deflectable portions having different resonant frequencies, and in which a control signal of relatively high frequency is supplied to the deflectable portion having the higher resonant frequency and a second control signal having relatively low frequency is supplied to the deflectable portion having a lower resonant frequency to control the position of the reproducing magnetic head.

In accordance with an aspect of this invention, means for deflecting a reproducing means relative to a scanning path in a video tape recorder comprises first deflectable means particularly suited to deform in response to a first control signal, second deflectable means particularly suited to deform in response to a second control signal, first applying means for applying deflections of the first deflectable means to the reproducing means and second applying means for applying deflections of the second deflectable means to the reproducing means and the first and second deflectable means respond differently to different frequencies and/or amplitudes of the respective control signals.

The above, and other, features and advantages of the present invention will become apparent from the following description read in conjunction with the accompanying drawings in which like reference numerals designate the same elements.

DETAILED DESCRIPTION OF THE PREFERRED EMBODIMENTS

Figure 1:
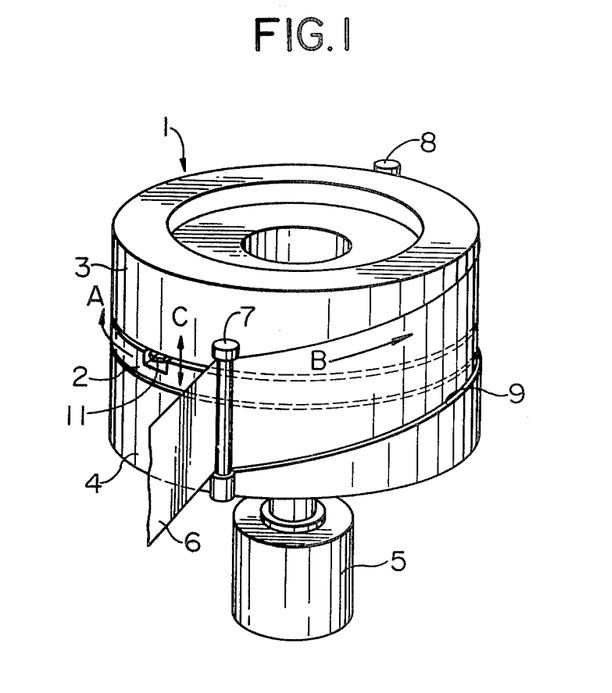
FIG. 1 is a perspective view of a rotary head drum assembly suitable for use with an embodiment of the present invention.

Referring to FIG. 1, there is shown a rotary head drum assembly 1 which includes a rotary disc 2 capable of being rotated in the direction shown by an arrow A. Rotary disc 2 is interposed between a stationary upper drum 3 and a stationary lower drum 4 which are mounted on a chassis (not shown) of a video tape recorder. Rotary disc 2 is rotated, for example, by an electric motor 5. A magnetic tape 6 is obliquely wrapped around the outer periphery of the upper and lower drums 3 and 4 and rotary disc 2 covering an arc of about 180°. Magnetic tape 6 is moved in the direction shown by an arrow B and is guided around rotary head drum assembly 1 by tape guides 7 and 8 and an oblique step 9 in lower drum 4. Two magnetic heads 11 (one of which is shown in FIG. 1) are affixed 180° apart on rotary disc 2. Magnetic heads 11 project slightly outward beyond the outer periphery of upper and lower drums 3 and 4 and rotary disc 2 to bring them into contact with magnetic tape 6 for recording or reproducing video signals.

Figure 2:
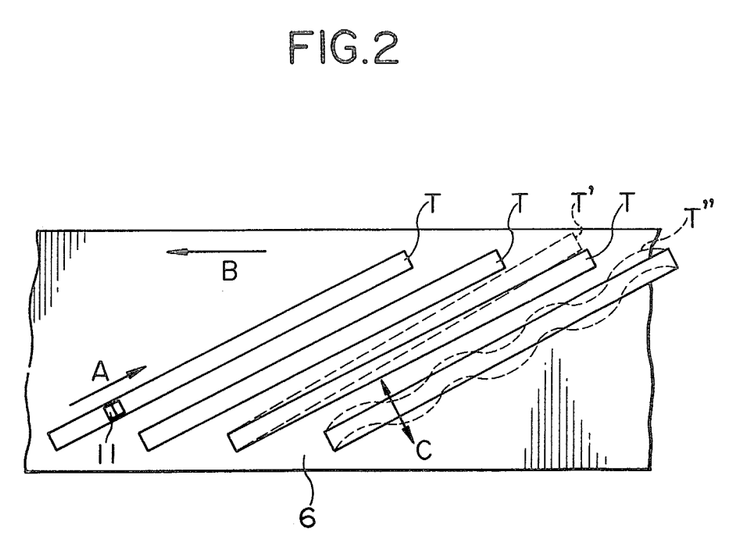
FIG. 2 is a plan view of a section of magnetic tape on which parallel recorded tracks are represented and which will be referred to in describing the present invention.

Referring now to FIG. 2, there is represented on a strip of magnetic tape 6 a plurality of recorded tracks T. Also shown is a magnetic head 11 which may be employed to record or reproduce information on tracks T. Arrows A and B represent the motion of magnetic head 11 and tape 6 respectively corresponding to motions shown in FIG. 1.

Tracks T are recorded with tape 6 moving in the direction shown by arrow B at a normal tape transport speed. If the tape transport speed during reproduction is different from the tape transport speed used during recording, the scanning path T' followed by a magnetic head is skewed with respect to the recorded track. Further, auto tracking of a track T is preferably achieved by "wobbling" or "dithering" a magnetic head in the width direction shown by arrow C to produce a scanning path, such as T'', which wobbles or dithers from side-to-side across a recorded track. Dithering of magnetic head 11 is used to produce a control signal which is employed to maintain magnetic head 11 centered on the track. In order to control a position of magnetic head 11 such that scanning path T' can be made to coincide with recorded track T and to produce the dithered scanning path T'', magnetic head 11 is mounted on an electro-mechanical transducing element which is capable of mechanical deflection in response to an electrical input. However, the combination of control motions shown in FIG. 2 is difficult to accomplish with a single electro-mechanical transducing element. This comes about because the correction of skew in the scanning path T' is accomplished at a field or frame rate, depending on the type of video tape recorder, whereas the dithering scanning path T'' employs a dithering rate which is several times, suitably more than 10 times, a field or frame rate in order to satisfactorily generate an auto-tracking control signal. Thus, a relatively large amplitude motion at a frequency of 30 or 60 Hz is required to correct skew in scanning path T' and a high frequency low amplitude motion, for example, at 720 Hz, is required to produce dithered scanning path T''. A single electro-mechanical transducing element suitably responsive to high and low frequencies of a ratio exceeding 10, but more practically 12 or 24, is not readily achieved.

Figure 3:
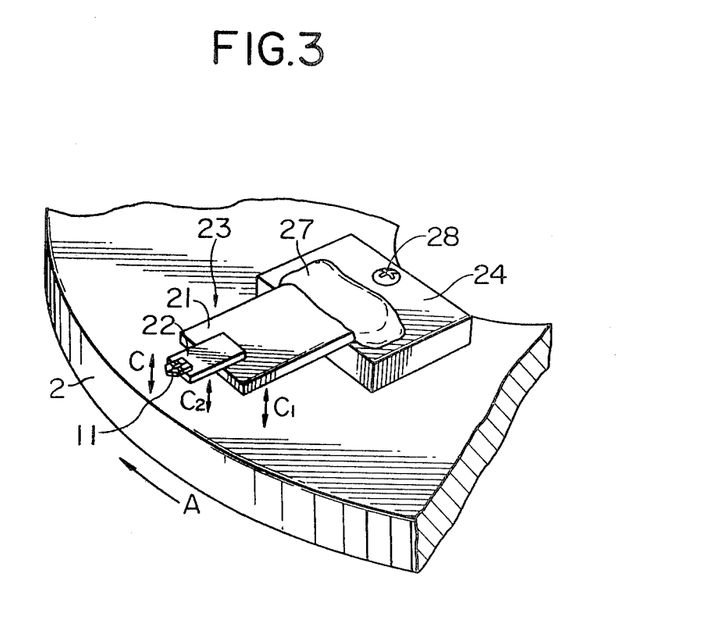
FIG. 3 is a fragmentary perspective view of part of a rotary disc having deflectable elements thereon according to an embodiment of the invention.

Referring now to FIG. 3, there is shown an embodiment of the invention which permits overcoming the limitations of the prior art. A first bi-morph leaf 21, which is suitably formed of two secured-together plates of piezo-ceramic material such as $BaTiO_3$, solid solutions of $PbZrO_3$ and $PbTiO_3$, or an organic high molecular piezo-electric compound, with electrodes deposited on both surfaces of each plate is affixed to a head chassis 24 by any suitable means, such as an adhesive 27. Head chassis 24 is mounted on rotary disc 2 by any suitable means such as a screw 28. A second, similarly formed bi-morph leaf 22 is affixed by any convenient means to the free end of bi-morph leaf 21. Bi-morph leaves 21 and 22 together form a head support 23. A magnetic head 11 is affixed to the free end of bi-morph leaf 22. As shown in FIG. 3, bi-morph leaf 21 is longer, wider and thicker than bi-morph leaf 22, so as to have a larger mass than the latter. Such larger mass is one of the characteristics which can make bi-morph leaf 21 capable of responding to lower frequency signals with the large amplitude excursions required for skew control. Bi-morph leaf 22 is capable of responding to the higher frequency signals with smaller excursions required for dithering control. Mechanical deflection of the free end of low frequency bi-morph leaf 21 results in motion in the direction of arrow $C_1$ parallel to the direction of arrow C. Similarly, mechanical deflection of the free end of high frequency bi-morph leaf 22 results in motion in the direction of arrow $C_2$ parallel to the direction of arrow C. The total motion of reproducing head 11 parallel to arrow C is the sum of motions $C_1$ and $C_2$ produced by bi-morph leaves 21 and 22. As will be realized from the disclosure, bi-morph leaves 21 and 22 may be independently driven by appropriate control signals in order to achieve desired composite motions of magnetic head 11 as previously described.

Figures 4A, 4B:
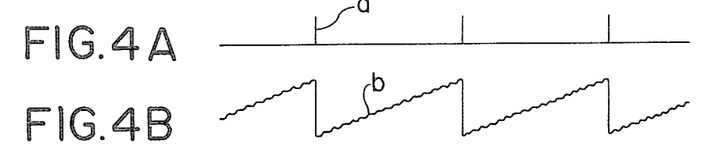
FIGS. 4A–4D are waveform diagrams of signals which will be referred to in explaining the operation of the embodiment of FIG. 3.

FIG. 4B shows the composite control signal b applied to magnetic head 11 during, for example, still reproduction. The composite control signal b of FIG. 4B is made up of a saw wave control signal component c shown in FIG. 4C and a small amplitude high frequency dithering control signal component d shown in FIG. 4D. A synchronizing signal a (FIG. 4A) which may be derived in a manner well known in the art in relation to the rotational position of a magnetic head 11 may be used to provide synchronization of saw wave control signal c with the rotational position of the corresponding magnetic head 11.

Figures 4C, 4D:
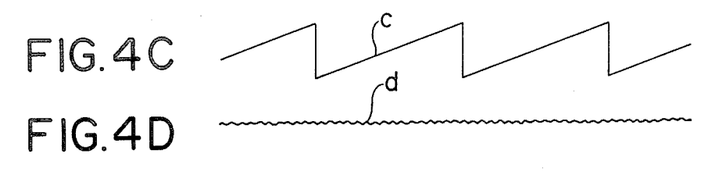
Figure 5:
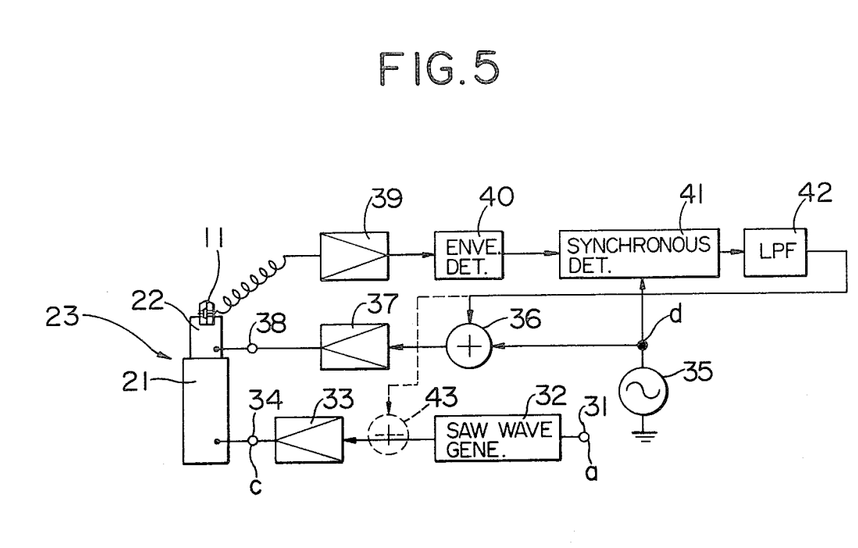
FIG. 5 is a block diagram of a circuit for obtaining the drive signals shown in FIGS. 4B—4B.

Referring now to FIG. 5, there is shown a circuit for producing control signals appropriate for application to bi-morph leaves 21 and 22 of FIG. 3. The synchronizing signal a (FIG. 4A) which may be, for example, a head change-over signal indicating changing over between the two magnetic heads 11, may be applied to a terminal 31 so as to trigger a saw wave generator 32. The saw wave signal may thus be suitably synchronized to the scanning period of a magnetic head. The saw wave signal from saw wave generator 32 is amplified in an amplifier 33 to produce the low frequency saw wave control signal c shown in FIG. 4C. The low frequency saw wave control signal c is applied through a terminal 34 to low frequency bi-morph leaf 21.

A sine-wave generator or oscillator 35 produces a suitable sine-wave signal, for example, of 720 Hz, corresponding to the high frequency component d shown in FIG. 4D. The sine-wave signal is applied to one input of an adder 36 which has its output amplified in an amplifier 38 and applied through a terminal 38 to high frequency bi-morph leaf 22. The resulting sine-wave dithering of reproduce head 11 produces the scanning path T'' shown in FIG. 2. The reproduced signal from magnetic head 11, which contains amplitude variations resulting from dithered scanning path T'' passing into and out of coincidence with recorded track T, is amplified in an amplifier 39 and applied to an input of an envelope detector 40. The detected output of envelope detector 40 is applied to an input of a synchronous detector 41. The sine-wave output of sine-wave generator 35 is applied to a second input of synchronous detector 41. Synchronous detector 41 has the characteristic that, if a phase of the envelope signal from envelope detector 40 has a predetermined relationship to the phase of the sine-wave signal from sine-wave generator 35 which indicates that the scanning path is dithered about a mean value centered on a recorded track T, no control output is produced. However, if a phase relationship exists between its two inputs which indicates an offset from the mean value, synchronous detector 41 produces an output which has an amplitude and polarity appropriate to adjust the average position of magnetic head 11 to be symmetrical with a recorded track as shown in T'' of FIG. 2. High frequency components in the control signal are removed in a low pass filter 42 and the resulting filtered control signal is applied to a second input of adder 36. The total signal thus applied to high frequency bi-morph leaf 22 includes both the dithering component from sine-wave generator 35 and a mean position correction component from synchronous detector 41. The tracking error signal from synchronous detector 41 contains generally only low frequency components. These low frequency components may alternatively be applied to low frequency bi-morph leaf 21 rather than to high frequency bi-morph leaf 22. An alternate embodiment is shown in dashed line wherein the mean position correction component from synchronous detector 41 is added to the saw wave control signal from saw wave generator 32 in an adder 43. When this alternate embodiment is employed, adder 36 may be omitted.

When the tape transport speed of tape 6 during reproduction is the same as the tape transport speed used during recording, skew control is not generally required. The output of saw wave generator 32 is not required in this circumstance and, therefore, saw wave generator 32 is suitably deactivated or disconnected.

Figure 6A:
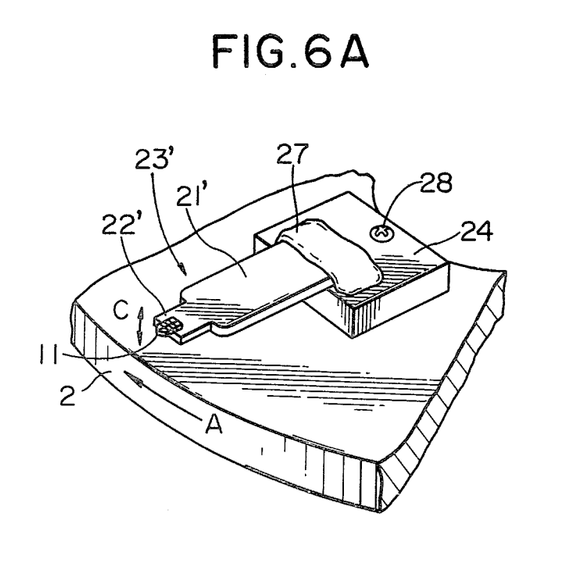
FIG. 6A is a fractional perspective view of an auto-tracking control system according to a second embodiment of the invention.

FIG. 6A shows a second embodiment of the invention in which bi-morph leaves 21' and 22', corresponding to bi-morph leaves 21 and 22 of FIG. 3, are integrally formed as a unitary head support 23' rather than being made as separate pieces and assembled together. Consequently, the embodiment of FIG. 6A eliminates the assembly labor required to bond the two bi-morph leaves to each other. Bi-morph leaf portion 21' is seen to be longer and wider than bi-morph leaf portion 22'. These physical differences produce different frequency responses and maximum deflection amplitudes corresponding to those characteristics of the separate bi-morph leaves shown in FIG. 3.

Figure 6B:
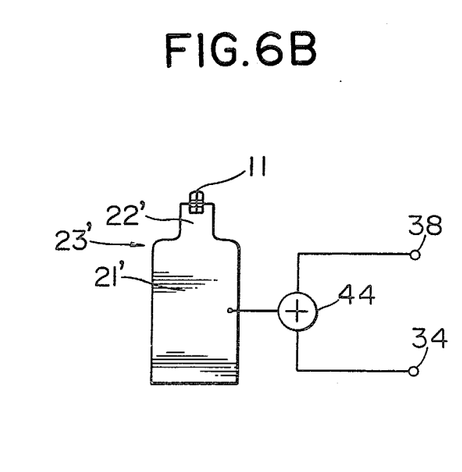
FIG. 6B is a schematic view showing the manner in which control signals may be applied to the second embodiment of the invention shown in FIG. 6A.

Referring now to FIG. 6B, one way of feeding control signals to the unitary bi-morph leaf head support 23' of FIG. 6A is shown. The dithering or wobbling sine-wave control signal applied to terminal 38 along with the tracking error signal and the saw wave control signal applied to terminal 34 are added in an adder 44 before being applied to a single point to head support 23'. Although both frequency signals are applied to bi-morph leaf portions 21' and 22', such signals are most effective at the bi-morph leaf portions designed to be responsive to their respective frequencies. Consequently, both high and low frequency responses are accomplished.

Figure 7:
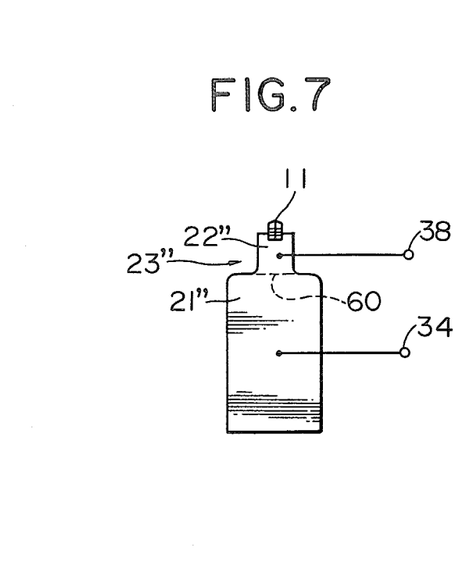
FIG. 7 is a schematic view of an auto tracking control system according to a third embodiment of the invention.

Referring now to FIG. 7, there is shown a unitary head support 23" having a high frequency bi-morph leaf portion 21" integrally formed with a low frequency bi-morph leaf portion 22". An insulating portion 60 electrically insulates high frequency bi-morph leaf portion 22' from control signals applied to low frequency bi-morph leaf portion 21' and vice versa. Consequently, high-frequency control signals applied at terminal 38 are effective only on high frequency bi-morph leaf portion 22" and low frequency control signals applied at terminal 34 are effective only on low frequency bi-morph leaf portion 21". Insulating portion 60 is conveniently formed by interrupting the electrodes deposited on the piezo-ceramic mterial.

Figure 8:
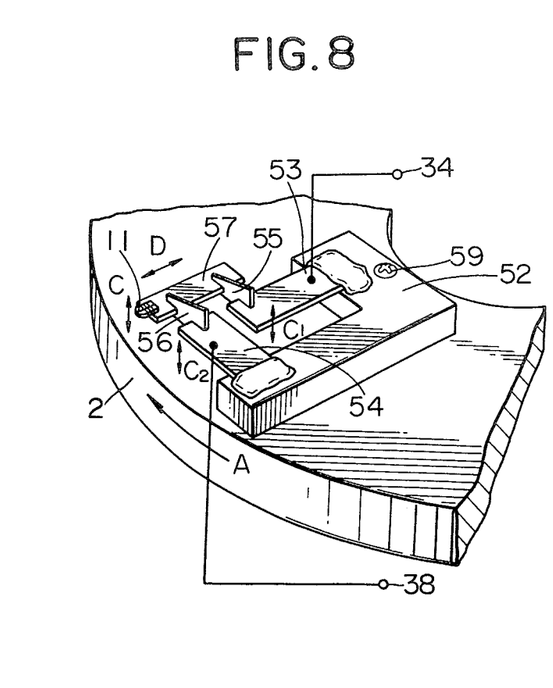
FIG. 8 is a fractional perspective view of an auto tracking control system according to the fourth embodiment of the invention.

A further embodiment of the invention employing a "centrifugal force type" head, is shown in FIG. 8. A magnetic head 11 is supported on a head support plate 57 which is, in turn, resiliently supported by leaf springs 55 and 56. Leaf springs 55 and 56 permit displacement of head support plate 57 and magnetic head 11 in the radial direction indicated by an arrow D due to centrifugal force as rotary disc 2 rotates at normal scanning speed. Radial deflection in this manner moves magnetic head 11 outward into contact with magnetic tape 6 during full speed rotation of rotary disc 2 but permits magnetic head 11 to be withdrawn out of contact with tape 6 when the apparatus is running slowly and/or is stopped in order to reduce wear of the head and damage to the magnetic tape.

A low frequency bi-morph leaf 53, having characteristics similar to low frequency bi-morph leaves previously described, is affixed by any convenient means, such as cementing, to a head chassis 52 which is, in turn, affixed as by a screw 59, to rotary disc 2. A high frequency bi-morph leaf 54, having characteristics similar to high frequency bi-morph leaves in other embodiments, is also affixed by cement to head chassis 52. Leaf spring 55 is affixed to the free end of low frequency bi-morph leaf 53 to transmit its motion to head chassis 57 and leaf spring 56 is affixed to the free end of high frequency bi-morph leaf 54 to also transmit its motion to head chassis 57. Low frequency control signals applied at terminal 34 are effective to move low frequency bi-morph leaf 53 in the direction of arrow $C_1$ which is parallel to the direction of arrow C. High frequency control signals applied at terminal 38 are effective to displace high frequency bi-morph leaf 54 in the direction of arrow $C_2$ which is also parallel to the direction of arrow C. As can be seen in FIG. 8, the composite motion in the direction of arrow C is a composite of motions $C_1$ and $C_2$ as in other embodiments. Although the axes of low frequency bi-morph leaf 53 and high frequency bi-morph leaf 54 are shown at right angles to each other, other angular relationships including parallel are equally included within the scope of the invention.

Having described specific embodiments of the invention with reference to the accompanying drawings, it is to be understood that the invention is not limited to those precise embodiments, and that various changes and modifications may be effected therein by one skilled in the art without departing from the scope of spirit of the invention as defined in the appended claims. For example, electro-mechanical transducer elements other than bi-morph leaves, such as mono-morph leaves, may be used. Besides varying the frequency response of bi-morph leaves by control of physical dimensions, frequency response may also be varied by changing the material from which the bi-morph leaves are made. This may permit a bi-morph leaf having uniform dimensions but having high and low frequency regions. In addition, the rectangular shape of the bi-morph leaves illustrated in the figures may be changed to any other regular or irregular geometric shape such as, for example, trapezoidal without departing from the scope of the invention.

What is claimed is:

1. Means for deflecting a reproducing means relative to a scanning path in a video tape recorder comprising: first deflectable means deformable by application thereto of a control signal and being particularly responsive to frequencies of a first range; second deflectable means also deformable by application thereto of a control signal and being particularly responsive to frequencies of a second range substantially different from said first range, and applying means for applying deflections of said first and second deflectable means to said reproducing means.

2. Means for deflecting according to claim 1, wherein said first deflectable means includes a bi-morph leaf.

3. Means for deflecting according to claim 2, wherein said second deflectable means includes a second bi-morph leaf and said applying means includes first connection means between said first and second bi-morph leaves and second connection means between said first bi-morph leaf and said reproducing means.

4. Means for deflecting according to claim 3, wherein said first connection means includes bonding means joining said first and second bi-morph leaves.

5. Means for deflecting according to claim 3, wherein said first connection means is constituted by unitary construction of said first and second bi-morph leaves.

6. Means for deflecting according to claim 5, wherein said first and second bi-morph leaves include electrode means for the application thereto of said first and second control signals.

7. Means for deflecting according to claim 6, wherein said electrode means on said first bi-morph leaf is electrically connected to said electrode means on said second bi-morph leaf.

8. Means for deflecting according to claim 7, further comprising adder means for adding said first and second control signals and for applying an added control signal to said electrode means.

9. Means for deflecting according to claim 6, wherein said electrode means on said first bi-morph leaf is electrically isolated from said electrode means on said second bi-morph leaf.

10. Means for deflecting according to claim 1, wherein said second deflectable means is operative to deform a greater maximum amplitude than said first deflectable means.

11. Means for deflecting according to claim 1, wherein said applying means include a head plate, connecting means for connecting said reproducing means to said head plate, a first leaf spring between a first point on said head plate and a free end of said first deflectable means, a second leaf spring substantially parallel to said first leaf spring between a second point on said head plate spaced from said first point and a free end of said second deflectable means.

12. Means for deflecting according to claim 1, further comprising control signal generating means for generating said control signal which includes reference signal generating means for generating a reference signal, means for applying said reference signal to said first deflectable means, synchronous detection means for comparing a phase of said reference signal with a phase of a signal reproduced from said scanning path by said reproducing means to produce a tracking error signal in response to said comparing, and means for applying said tracking error signal to one of said first and second deflectable means for further deflecting said reproducing means in response to said tracking error signal.

13. Means for deflecting according to claim 12, wherein the last mentioned means includes an adder operative to add said tracking error signal to said reference signal.

14. Means for deflecting according to claim 12, wherein said control signal generating means further includes saw wave signal generating means for generating a saw wave signal synchronized to scanning of said scanning path by said reproducing means, and means for applying said saw wave signal to said second deflectable means.

15. Means for deflecting according to claim 14, wherein an adder is operative to add said tracking error signal and saw wave signal to produce an added control signal and said added control signal is applied to said second deflectable means.

16. Means for deflecting according to claim 1, wherein said first and second deflectable means are operative to deflect said reproducing means in a composite motion which has a generally saw wave component having a frequency substantially equal to a scanning path interval and a generally sine wave component superimposed on said saw wave component, said sine wave component having a substantially higher frequency and a substantially lower amplitude than said saw wave component.

17. An auto-tracking control system for use in apparatus for reproducing a video signal recorded in successive parallel tracks on a recording medium comprising: signal reproducing means for scanning said recording medium to reproduce said recorded video signal; deflectable means for supporting and deflecting said signal reproducing means, said deflectable means having at least first and second deflectable portions, said first deflectable portion being deflectable in response to a first control signal having a first characteristic and being relatively non-responsive to a second control signal, said second deflectable portion being deflectable in response to a second control signal having a second characteristic and being relatively non-responsive to said first control signal; said first and second characteristics being substantially different frequency components; and control signal generating means for generating said control signals.

18. The apparatus according to claim 17, wherein said deflectable means is of piezo-ceramic material.

19. The apparatus according to claim 18, wherein said piezo-ceramic material is a bi-morph leaf operative to move said signal reproducing means in a direction transverse to the scanning path thereof.

20. The apparatus according to claim 19, wherein said signal reproducing means is a magnetic head with an airgap.

21. The apparatus according to claim 20, wherein said first tracking control signal is a substantially low frequency signal related to a scanning cycle of said magnetic head scanning said parallel tracks and said second tracking control signal is a substantially higher frequency signal.

22. The apparatus according to claim 21, wherein said substantially low frequency signal is a saw wave signal.

23. The apparatus according to claim 17, wherein said control signal generating means includes: reference oscillator means for generating a reference signal; envelope detector means for detecting a level of output of a video signal reproduced by said signal reproducing means; synchronous detection means for detecting a phase difference between an output of said envelope detector and said reference signal; said synchronous detector being operative to produce a tracking error signal in response to a condition of said phase difference; and adder means for feeding said tracking error signal to said deflectable means.

24. The apparatus according to claim 23, wherein said adder means is an adder for adding said tracking error signal to said reference signal.

25. The apparatus according to claim 23, including means for supplying said tracking error signal to said second deflectable portion which responds to a substantially lower frequency component.

26. The apparatus according to claim 23, wherein said control signal generating means further includes a saw wave signal generator synchronized with scanning cycles of said magnetic head.

27. The apparatus according to claim 17, wherein said deflectable means includes a head support plate for supporting said signal reproducing means and spring members, said deflectable portions being separated from each other and being connected through said spring members to said head support plate, respectively.

28. The apparatus according to claim 17, in which an axis of said first deflectable portion is at an angle of 90° to an axis of said second deflectable portion.

* * * * *